(12) United States Patent
Glass et al.

(10) Patent No.: US 10,339,214 B2
(45) Date of Patent: Jul. 2, 2019

(54) STRUCTURED TERM RECOGNITION

(71) Applicant: International Business Machines Corporation, Armonk, NY (US)

(72) Inventors: Michael R. Glass, Austin, TX (US); Alfio M. Gliozzo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 13/667,729

(22) Filed: Nov. 2, 2012

(65) Prior Publication Data
US 2013/0117024 A1    May 9, 2013

Related U.S. Application Data

(60) Provisional application No. 61/555,652, filed on Nov. 4, 2011.

(51) Int. Cl.
*G06F 17/27* (2006.01)
*G10L 15/19* (2013.01)
*G10L 15/18* (2013.01)

(52) U.S. Cl.
CPC .............. *G06F 17/27* (2013.01); *G10L 15/19* (2013.01); *G10L 15/1815* (2013.01)

(58) Field of Classification Search
CPC ... G10L 15/183; G10L 15/19; G10L 15/1815; G10L 15/1822
USPC ........................................ 704/257, E15.019
See application file for complete search history.

(56) References Cited

U.S. PATENT DOCUMENTS

| | | | | | |
|---|---|---|---|---|---|
| 5,325,298 | A | * | 6/1994 | Gallant | 704/9 |
| 5,794,178 | A | * | 8/1998 | Caid et al. | 704/9 |
| 6,006,223 | A | * | 12/1999 | Agrawal | G06F 17/30616 704/251 |
| 6,915,254 | B1 | * | 7/2005 | Heinze et al. | 704/9 |
| 7,493,253 | B1 | * | 2/2009 | Ceusters | G06F 17/2775 704/9 |
| 7,587,308 | B2 | * | 9/2009 | Kasravi | G06F 17/273 382/229 |

(Continued)

FOREIGN PATENT DOCUMENTS

EP    1462950 A1 *  9/2004

OTHER PUBLICATIONS

Friedman et al, "A General Natural-language Text Processor for Clinical Radiology," Mar/Apr 1994, Journal of the American Medical Informatics Association, vol. 1, No. 2, pp. 161-174.*

(Continued)

*Primary Examiner* — Lamont M Spooner
*Assistant Examiner* — Oluwadamilola M Ogunbiyi
(74) *Attorney, Agent, or Firm* — Scully, Scott, Murphy & Presser, P.C.

(57) ABSTRACT

A method, system and computer program product for recognizing terms in a specified corpus. In one embodiment, the method comprises providing a set of known terms t∈T, each of the known terms t belonging to a set of types Γ (t)= {γ$_1$, . . . }, wherein each of the terms is comprised of a list of words, t=w$_1$, w$_2$, . . . , w$_n$, and the union of all the words for all the terms is a word set W. The method further comprises using the set of terms T and the set of types to determine a set of pattern-to-type mappings p→γ; and using the set of pattern-to-type mappings to recognize terms in the specified corpus and, for each of the recognized terms in the specified corpus, to recognize one or more of the types γ for said each recognized term.

19 Claims, 6 Drawing Sheets

(56) References Cited

U.S. PATENT DOCUMENTS

| | | | | |
|---|---|---|---|---|
| 7,610,192 | B1* | 10/2009 | Jamieson | 704/9 |
| 8,051,088 | B1* | 11/2011 | Tibbetts | G06F 17/2785 707/749 |
| 8,706,474 | B2* | 4/2014 | Blume et al. | 704/7 |
| 2004/0030540 | A1* | 2/2004 | Ovil et al. | 704/1 |
| 2007/0033218 | A1* | 2/2007 | Taylor | 707/102 |
| 2007/0244690 | A1* | 10/2007 | Peters | 704/8 |
| 2008/0091413 | A1* | 4/2008 | El-Shishiny | G06F 17/30625 704/10 |
| 2008/0301121 | A1* | 12/2008 | Suzuki | G06F 17/30734 |
| 2009/0063189 | A1* | 3/2009 | Hupke et al. | 705/3 |
| 2009/0234640 | A1* | 9/2009 | Boegl | G06F 17/2785 704/9 |
| 2011/0029303 | A1* | 2/2011 | Mizuguchi | G06F 17/2735 704/9 |

OTHER PUBLICATIONS

Pereira et al, "Distributional Clustering of English Words," 1993, Proceedings of the 31st Annual Meeting of the Association for Computational Linguistics, vol. 1, No. 2, pp. 183-190.*

Lin D., "Automatic Retrieval and Clustering of Similar Words," 1993, Proceedings of the 36th Annual Meeting of the Association for Computational Linguistics and 17th International Conference on Computational Linguistics, vol. 2, pp. 768-774.*

Strapparava C. et al, "Pattern Abstraction and Term Similarity for Word Sense Disambiguation: IRST at Senseval-3" Proceedings of the Third International Workshop on Evaluation of Systems for the Semantic Analysis of Text, 2004.*

Ido et al, "Similarity-based models of word cooccurrence probabilities," Machine learning 34. 1-3, 1999, pp. 43-69.*

* cited by examiner $$\theta_{DC} \cdot \text{cosine}(v, cv) \# \text{inCluster}(w,c) \wedge \text{distVect}(w,v) \wedge \text{distCentroid}(c,cv)$$
$$\text{cluster}(c) \Rightarrow \text{distCentroid}(c, \textbf{sum}(\{v : \text{inCluster}(w,c) \wedge \text{distVect}(w,v)\}))$$
$$\theta_{TC} \; \text{cosine}(v,cv) \# \text{inCluster}(w,c) \wedge \text{typeVect}(w,v) \wedge \text{typeCentroid}(c,cv)$$
$$\text{cluster}(c) \Rightarrow \text{typeCentroid}(c, \textbf{sum}(\{tv : \text{inCluster}(w,c) \wedge \text{typeVect}(w, tv)\}))$$
$$\text{wordAt}(t, i, w) \wedge \text{inCluster}(w,c) \Rightarrow \text{typeAt}(t, i, c)$$
$$\text{term}(t) \Rightarrow \text{patternOf}(t, \textbf{makePattern}(\{(i, c) : \text{typeAt}(t, i, c)\}))$$
$$\theta_A \cdot \text{scoreType}(t, \gamma) \# \text{isRule}(p, \gamma) \wedge \text{patternFor}(p, t)$$
$$\theta_{REG} \# \text{isRule}(p, \gamma)$$

LOGICAL DESCRIPTION OF THE SEQUENCE OF CLUSTERS MODEL

FIG. 2

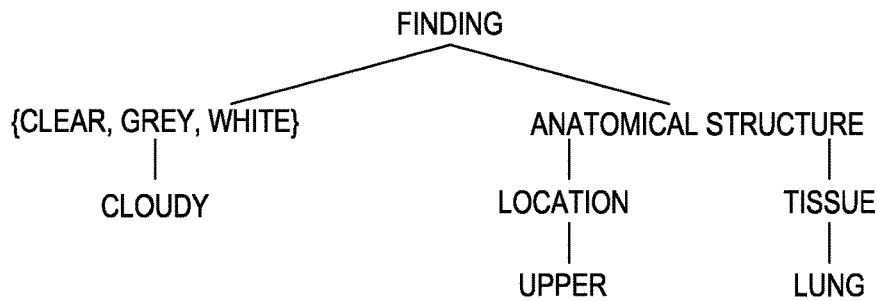

EXAMPLE PCFG PARSE

FIG. 3

$$\text{wordAt}(t, i, w) \wedge \text{inCluster}(w, \gamma, x) \Rightarrow \text{chart}(t, i, (i+1), \gamma, x)$$
$$\text{isRule}(\gamma_1, \gamma_2, \gamma_p, x_p) \wedge \text{chart}(t, i, j, \gamma_1, x_1) \wedge \text{chart}(t, j, k, \gamma_2, x_2) \Rightarrow$$
$$\text{typeAt}(t, i, k, \gamma_p, (x_1 + x_2 + x_p))$$
$$\text{typeAt}(t, i, j, \gamma, z) \; \text{chart}(t, i, j, \gamma, \max(\{x : \text{typeAt}(t, i, J, \gamma, x)\}))$$
$$\text{term}(t, l) \Rightarrow \text{vitParse}(t, \textbf{maxType}(\{(\gamma, x) : \text{chart}(t, 0, l, \gamma, x)\}))$$
$$\theta_A \cdot \text{scoreType}(t, \gamma) \# \text{vitParse}(t, \gamma)$$
$$\theta_{REG} \# \text{isRule}(\gamma_1, \gamma_2, \gamma_p, x_p)$$

LOGICAL DESCRIPTION OF THE PCFG MODEL

FIG. 4

LEARNING CURVE FOR SEQUENCE OF CLUSTERS MODEL

PERFORMANCE PER GROUP FOR SEQUENCE OF CLUSTERS

STRUCTURED TERM RECOGNITION

CROSS REFERENCE TO RELATED APPLICATION

This application claims the benefit and priority to U.S. Provisional Patent Application Ser. No. 61/555,652, filed Nov. 4, 2011, the entire content and disclosure of which is hereby incorporated herein by reference.

BACKGROUND

This invention generally relates to term recognition, and more specifically, to recognizing new terms of a specific type based on the structure of known terms for that type.

Recognizing occurrences of domain specific terms and their types is important for many text processing applications. This problem is not easy, particularly in domains like medicine, where very rich terminology is generated by domain experts on a daily basis.

In spite of the large interest in statistical term recognition in Natural Language Processing (NLP), state of the art approaches for term recognition in the medical domain are still based on dictionary lookup with some heuristics for partial mapping. In fact, very large terminological resources, such as the Unified Medical Language System (UMLS), have been developed in the medical domain. The reason is that medical terminology cannot be identified by looking at superficial features only, such us capitalization of words, prefixes and suffixes. In fact, diseases names, symptoms and most medical terms are not proper names, so they are not capitalized. In addition, they are usually characterized by a rather complex internal structure and composed by many words. In addition, distributional similarity metrics, i.e. recognition approaches based on the analysis of the local context where the term is located, work well when applied to single words or very frequent words, which is not the case for most of the medical terms we are interested in.

In the context of the research on adapting a question answering system to the medical domain, the term recognition problem is encountered in many places. For example, recognizing names of diseases, symptoms and treatments is necessary to answer most of the Doctor's Dilemma™ questions (American College of Physicians, 2012), an evaluation benchmark we used to measure the ability to answer medical questions. To assess the validity of the answer "HFE hereditary hemochromatosis" with respect to the question "Metabolic condition that can set off airport metal detector", it is important to know that the answer is a type of metabolic condition. One way to address this problem is to use medical lexica where different terms are associated to semantic types, and then check whether the type of the candidate answer matches the type required by the question.

UMLS is far from complete. Many disease names (especially multi-words) are not recognized by dictionary lookup approaches. In many cases, specific terms are missing (e.g. "HFE hereditary hemochromatosis" in the question above).

BRIEF SUMMARY

Embodiments of the invention provide a method, system and computer program product for recognizing terms in a specified corpus. In one embodiment, the method comprises providing a set of known terms $t \in T$, each of the known terms t belonging to a set of types $\Gamma(t) = \{\gamma_1, \ldots\}$, wherein each of the terms is comprised of a list of words, $t = w_1, w_2, \ldots, w_n$, and the union of all the words w for all the terms t is a word set W. The method further comprises using the set of terms T and the set of types to determine a set of pattern-to-type mappings $p \rightarrow \gamma$; and using the set of pattern-to-type mappings to recognize terms in the specified corpus and, for each of the recognized terms in the specified corpus, to recognize one or more of the types $\gamma$ for said each recognized term.

In an embodiment, set of terms T and the set of types $\Gamma$ are used to determine a set of pattern-to-type mappings by forming a multitude of clusters $C_1, C_2, \ldots, C_n$ from the words of the terms by assigning at least some of the words of at least some of the terms to the clusters according to a defined process; and forming a set of rules R, based on said clusters, to map the terms t to the types $\gamma$.

In one embodiment, at least one of the words of each of the terms is assigned to at least one of the clusters.

In an embodiment, the forming a set of rules R includes forming one of the rules $p \rightarrow \gamma$ to map one of the terms t to one of the types $\gamma$, based on the clusters to which the words of said one of the terms are assigned.

In one embodiment, the rules map patterns of the clusters to the types $\gamma$.

In one embodiment, each word of each term is assigned to one and only one of the clusters.

In an embodiment, each pattern of the clusters maps to at most one of the types $\gamma$.

In one embodiment, the words are assigned to the clusters based on distributional similarity of the words.

In an embodiment, the using the set of pattern-to-type mappings to recognize terms in the specified corpus includes selecting a group of words from the specified corpus, identifying one or more contexts in the specified corpus for each of the selected group of words, and grouping said selected group of words based on a defined similarity of the contexts of the selected words.

In one embodiment, one context is identified for each occurrence of each of the selected words in the specified corpus, and each context of each occurrence of each of the selected words in the specified corpus is comprised of a set of words adjacent to said each occurrence in the corpus.

Embodiments of the invention analyze the internal structure of plural or multi-word terms by learning patterns of word clusters. Embodiments of the invention can be used to boost the performances of term recognition systems based on dictionary lookup while extending the coverage of large ontologies like UMLS.

BRIEF DESCRIPTION OF THE DRAWINGS

FIG. 2 shows the logical description of the Sequence of Clusters model according to an embodiment of the invention.

FIG. 3 depicts an example of a PCFG parse according to an embodiment of the invention.

FIG. 4 shows the logical description of the PCFG model according to an embodiment of the invention.

DETAILED DESCRIPTION

Figure 1:
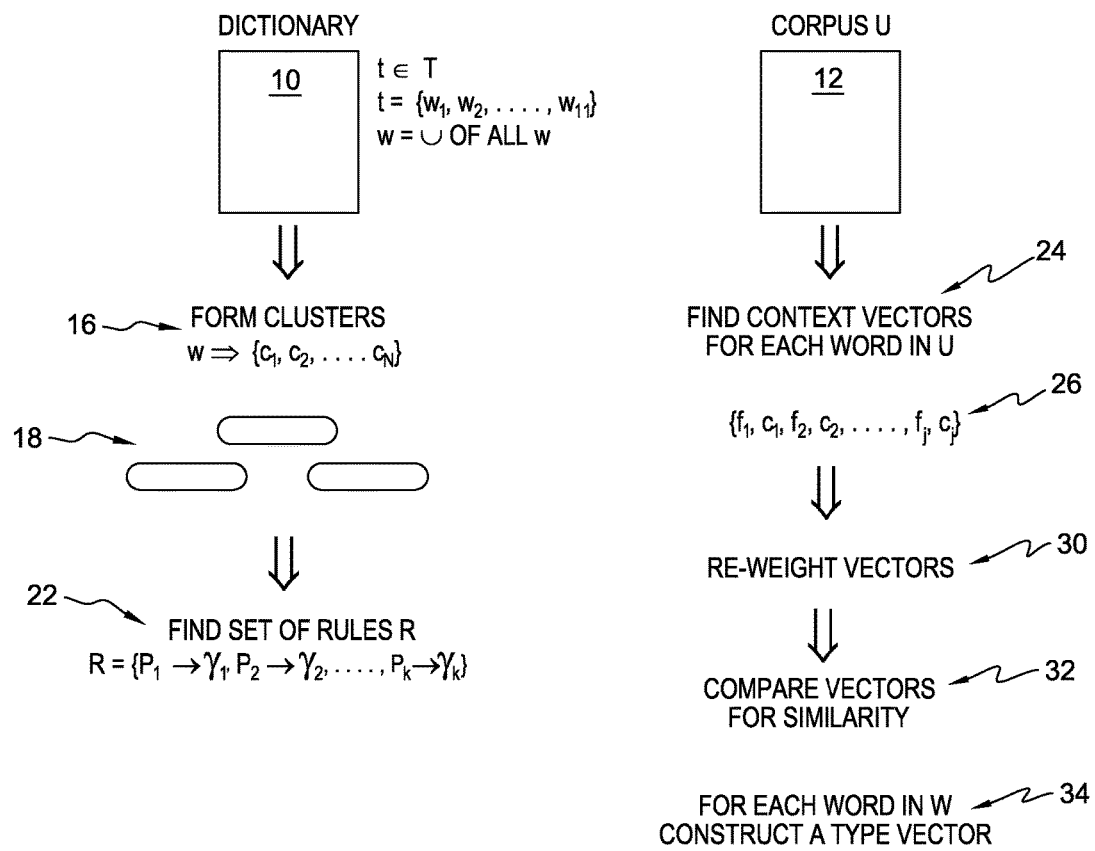
FIG. 1 schematically illustrates a term recognition process in accordance with an embodiment of the invention.
Figure 5:
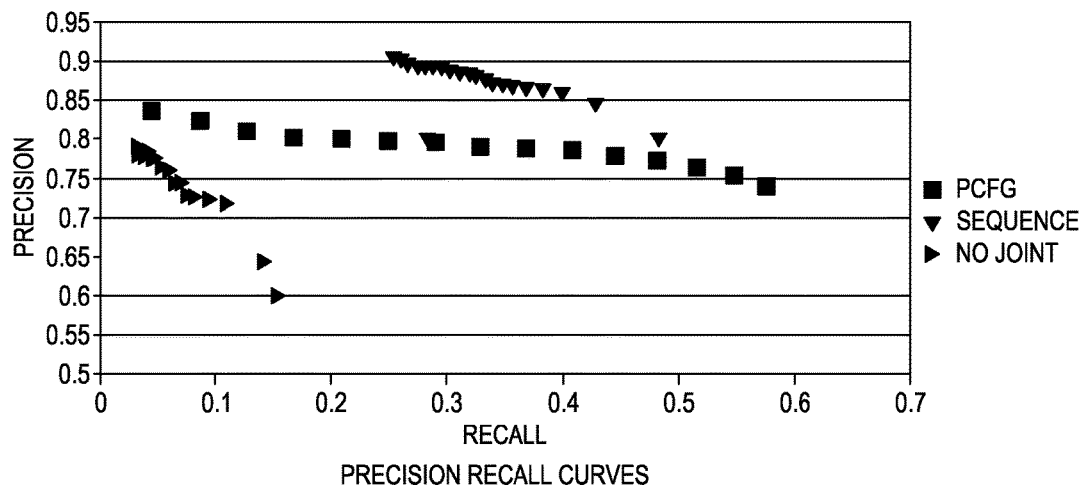
FIG. 5 illustrates a precision/recall curve obtained using an embodiment of the invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention provide a method, system, and computer program product for recognizing domain specific terms. As mentioned above, recognizing occurrences of domain specific terms and their types is important for many text processing applications. This problem is not easy, particularly in domains like medicine, where very rich terminology is generated by domain experts on a daily basis. In spite of the large interest in statistical term recognition in Natural Language Processing (NLP), state of the art approaches for term recognition in the medical domain are still based on dictionary lookup with some heuristics for partial mapping (Aronson, 2001). In fact, very large terminological resources, such as the Unified Medical Language System (UMLS) (Bodenreider, 2004), have been developed in the medical domain. The reason is that medical terminology cannot be identified by looking at superficial features only, such us capitalization of words, prefixes and suffixes.

UMLS is far from complete. Many disease names (especially multi-words) are not recognized by dictionary lookup approaches. In many cases, specific terms are missing (e.g. "HFE hereditary hemochromatosis" in the question above). The problem is particularly evident when examining the answers to the Doctor's Dilemma questions. Analyzing 704 doctor's dilemma questions where the system located the correct answer as candidate, in 16.5% of the cases one of the correct answers was not in UMLS. About half of them were quantities (e.g. 20 mg) while the remaining half were medical terms that are not in UMLS. On the latter subset of questions, the end to end accuracy of the full QA system dropped by almost 50% if compared to the performance on questions where the answer was an UMLS term. The explanation for this drop in performance is mostly due to type recognition problems: the system is not able to select the right answer on the basis of its type, for example confusing treatments with diseases.

Embodiments of the invention are able to recognize the type of domain specific terms based on an innovative principle, called Structured Term Recognition (STR). This principle begins with the observation that in many technical domains—and in the medical domain in particular, terms have repetitive patterns. For example, terms describing cancer include "bladder cancer", "brain tumor", "skin cancer" and "uterine sarcoma". These terms are all composed of a word indicating a part of the human anatomy followed by a word similar to "cancer". If the sequence of words "pituitary tumor" appears in text, and "pituitary" is known to be an a word indicating a part of the anatomy, it is reasonable to identify this as a cancer term even if it is not in the dictionary of cancer terms. A simple baseline where any noun phrase with the word "cancer" as it's head is identified as a cancer term will lead to such misidentifications as "some types of cancer" and "a different cancer". In fact, syntactic information alone is not enough to recognize technical terms, additional semantic information reflecting the type of the term constituents should be considered.

Structured Term Recognition (STR) is a way to address this problem. Generally, this is done by examining the semantic structure of terms, acquiring semantic patterns describing that semantic structure, and identifying new terms with similar structure.

In embodiments of the invention, STR begins with an existing dictionary and uses patterns to extend its coverage. Embodiments in the invention do not require the use contextual information or shallow features describing the term itself, instead use internal deep semantic features describing what a domain term should look like, i.e. its semantic pattern. Combinations of STR and techniques based on contextual information may be used.

Embodiments of the invention use three different approaches to recognizing occurrences of domain specific terms and their types. Two of these approaches are based on recognizing terms on the basis of sequences of the word clusters, and a third approach is based on Probabilistic Context Free Grammars (PCFG).

With reference to FIG. 1 the inputs of STR are a set of terms $t \in T$ from a dictionary 10, each belonging to a set of types $\Gamma(t)=\{\gamma_1, \gamma_2, \ldots\}$, and a domain specific corpus U 12. Terms are composed of lists of words $t=w_1, w_2, \ldots, w_n$ as identified by a tokenizer. The union of all tokens for all of the terms is the word set W.

The output of STR is a set of pattern-to-type mappings $p \rightarrow \gamma 22$ that can be used to recognize terms and their type in new texts. These terms are not necessarily present in U.

STR combines two components:
1. Clustering words in W by their distributional and type similarity.
2. Constructing patterns describing terms in the dictionary.

As discussed below in more detail:
(a) Sequences of Clusters are patterns; and
(b) Patterns are the left hand side of PCFG rules.

Word Clustering

The goal of this word clustering is to cluster the words in W into clusters $C_1, C_2, \ldots, C_n$, as represented at 16. Clusters 18 are partly determined by distributional similarity, meaning that words in the same cluster have similar meanings because they are substitutable in context.

Using a large, domain specific, unannotated corpus U, STR gathers, at 24, vectors 26 describing the context in which each word is found. Since parsing is generally lower quality in non-newswire domains, dependency based contexts are not used. Instead the corpus is simply tokenized. Contexts are built from a small window of surrounding words: two words to the left and two words to the right. The information about the direction and distance from the word is retained. For example, in the sentence "Early detection of cancer increases the odds of successful treatment." the contexts for the word "cancer" are given in table 1.

TABLE 1

| Contexts for "cancer" |  |
| --- | --- |
| cancer |  |
| Direction | Context Word |
| Left-2 | detection |
| Left-1 | of |
| Right-1 | increases |
| Right-2 | the |

For each word, a vector of contexts 26 is built. In order to build the context vector, context words are not restricted to words in W, instead any possible token in the large corpus is considered. Each dimension of the vector is an individual context f and its value is the number of times this context occurred with the word. At 30, this vector of raw counts is re-weighted, otherwise very high frequency but uninformative contexts, such as "of" and "the", may dominate. As an example, Pointwise Mutual Information (PMI) as a re-weighting method. PMI measures the strength of association between two events such as the occurrence of a word and the occurrence of a context.

$$pmi(w; f) = \log\frac{p(w, f)}{p(w)p(f)}$$

Equation 1 gives the formula for PMI, where p(w) is the frequency of the word in the corpus divided by the number of words in the corpus and p(f) is the frequency of the context divided by the total number of contexts.

Once the context vectors for all the words are gathered and re-weighted, these context vectors can, at 32, be compared for similarity using, for example the cosine similarity metric.

The domain specific dictionary may have many of the words in W mapped to types. However, in general a word need not be mapped to one type. It may have multiple senses, each with a distinct type. As represented at 34, for each word in w, a type vector is constructed, where the dimensions are types and the value is either a one or zero depending on whether the word is given as that type in the dictionary. Since the dictionary groups words with similar meanings in the same type, words with overlapping type vectors will have some meanings that are similar.

Pattern Acquisition

The goal of this pattern acquisition is to learn a set of rules $R=\{p_1 \rightarrow \gamma_1, p_2 \rightarrow \gamma_2, \ldots, p_k \rightarrow \gamma_k\}$ which are able to recognize most terms in T and at the same time can be used to identify new terms in the large corpus U. This is done by generating a set of candidate rules and scoring them according to how they perform on a training set. In the discussion below, two different models are trained for clusters and patterns. These two models are referred to as a sequence of clusters model and a probabilistic context free grammar model.

In the sequence of clusters model, each word is assigned to a single cluster, patterns are sequences of clusters, and rules map a pattern to a type. Each possible sequence of clusters maps to at most one type.

In the probabilistic context free grammar (PCFG) model, words are assigned to multiple clusters, each assignment has some weight corresponding to a probability. The rules are a set of binary PCFG rules where two non-terminals are mapped to a single non-terminal. All non-terminals on the right hand side of such rules are types. Each possible sequence of clusters has a Viterbi (most likely) parse ending in a single type.

Sequence of Clusters

For the Sequence of Clusters model, the clustering is a mapping function $\Theta: W \rightarrow C$ assigning each word in W to its corresponding cluster. The patterns are the mappings of each term $t \in T$ into its corresponding pattern $P(t)=p=\Theta(w_1), \Theta(w_2), \ldots, \Theta(w_j)$, where t is the sequence of words $t=w_1, w_2, \ldots, w_j$. A term is typed if there is a rule $P(t) \rightarrow \gamma \in R$. This typing is correct ($t \in$ Correct) if t has $\gamma$ as a type in the dictionary, $\gamma \in \Gamma(t)$, otherwise it is incorrect ($t \in$ Incorrect).

An example sequence of clusters pattern and some of its recognized terms are given in Table 2. The clusters are named according to their most frequent members. So "{sensation, fear, feeling}" is the cluster that includes those words, as well as other distributionally similar words.

TABLE 2

Example pattern and recognized terms

| Pattern | | |
|---|---|---|
| {spastic, flaccid, tonic} | {sensation, fear, feeling} | {tenderness, headache, tremor} |
| Recognized Terms | | |
| horizontal | gaze | parexis |
| tonic | reflex | spasm |
| dural | puncture | headache |
| exertional | heat | exhaustion |
| charley | horse | cramps |

The training seeks to create rules and word-to-cluster mappings to maximize intra-cluster similarity and the performance of the rules on the training data. The intra-cluster similarity is measured by the cosine of each word to its cluster's centroid. The performance of the rules is given by $|Correct|-|Incorrect|+\theta_{REG} \cdot |R|$. The $\theta_{REG}$ is a regularization parameter to penalize the creation of too many rules.

Non-Joint Optimization

One way of doing this training is to first optimize intra-cluster similarity, which can be converted to the objective function in spherical KMeans. As an example, GMeans, a variant of KMeans that uses first variation to escape from some local maxima, may be used to cluster the words. Then, given fixed word-to-cluster assignments, the optimal set of rules may be found in linear time. By mapping each term to its pattern and constructing a hash map from patterns to sets of terms for any possible $\theta_{REG}$ if mapping the pattern to the most frequent type $\gamma_{ts}$ in its term set will improve rule performance. This method is fast, but it does not perform nearly as well as a joint optimization.

Joint Optimization

In an embodiment of the invention, the method of joint optimization is to cast the problem as a MAP (Maximum a posteriori) inference task in probabilistic logic and use a general purpose probabilistic inference engine to do the optimization. Different sets of word-to-cluster mappings and rules are different possible worlds. The probability of a world is given by the objective function and the inference attempts to find the most likely world.

An embodiment of the objective function is described by the formulas in FIG. 2, which closely matches the description given to the probabilistic inference engine. In this description, all variables are implicitly universally quantified. The quantity preceding the "#" in the formulas that have them is a weight, every true grounding of the formula on the right adds the quantity on the left to the weight of the possible world. Like Markov Logic the semantics of the weight are that it is the log of an unnormalized probability. Unlike Markov Logic, the formula is not limited to first order logic.

There are three basic parts of the object function shown in FIG. 2. The first four lines of FIG. 2 give the objective function for spherical KMeans, lines 1 and 2 using distributional similarity and lines 3 and 4 using type vector similarity. The next three lines of FIG. 2 evaluate the performance of the patterns on the training data. The final line is the regularization, penalizing the creation of too many patterns.

The predicates distVect, typeVect, cluster, term, wordAt are given as evidence to the inference. Each word is related to its normalized distribution vector and type vector by distVect and typeVect respectively. A term, position and word at that position are related by wordAt. The function makePattern takes a set of index/cluster pairs and produces a sequence of clusters as a string so that for every term t, patternOf (t, P(t)). The distribution and type centroids are found by summing the corresponding vectors from the words in the clusters. Since cosine is our similarity metric, it is not necessary to renormalize these vectors. The function scoreType implements the logic of returning a 1 for a correct type mapping, −1 for an incorrect type mapping and 0 for a ∅ type mapping.

The $\theta$ parameters of the objective function of FIG. 2 control the balance of the different components of the optimization. For example, selected values may be: $\theta_{DC}=1$, $\theta_{TC}=1$, $\theta_A=1$, $\theta_{REG}=-3$.

The predicates inCluster, isRule are the proposal predicates. The basic inference algorithm is to make proposals which are then either accepted or rejected. In an embodiment of the invention, there are three proposals: move a word to a different cluster, create a rule, and remove a rule. A proposal is accepted if and only if it improves the objective function. The proposals are described formally in Table 3. The variables in the proposal formula are bound to a random true grounding of the formula. Then the remove list is set false and the add list is set true.

TABLE 3

Proposals for the Sequence of Clusters Model

| Proposal Formula | Remove | Add |
|---|---|---|
| inCluster(w, $c_1$)∧ cluster($c_2$)∧ $c_2 \neq e_2$ | inCluster(w, $c_2$) | inCluster(w, $c_2$) |
| patternFor(p, t)∧ $\gamma \in \Gamma(t)$∧¬ isRule(p, $\gamma$) | ∅ | isRule(p, $\gamma$) |
| isRule(p, $\gamma$) | isRule(p, $\gamma$) | ∅ |

A key optimization is to not recompute the centroid of each cluster on every proposal. Instead, it is recomputed with a probability that decreases as the size of the cluster increases. The intuition behind this idea is that the centroid does not change much if the size of the cluster is large.

A final step in sequence of clusters is to find the optimal pattern set given the word-to-cluster assignments, as in the non-joint approach. This step can also accommodate different precision recall trade-offs by varying the $\theta_{REG}$ parameter.

In the sequence of clusters model, in embodiments of the invention, attention may be restricted to terms of length two and three so that each sequence of clusters will have many terms that match it.

Probabilistic Context Free Grammar

In order to address longer terms, and to improve performance, a Probabilistic Context Free Grammar (PCFG) for terms may be used. This grammar is binary with non-terminals comprised of types and clusters.

For all words in the dictionary as terms, their cluster assignments to their types are fixed, initially with equal weight. Formally, for all single-word terms w and all types $\gamma \in \Gamma(w)$, inCluster(w, $\gamma$, 1). The results of the previous model may be used to assign clusters to the remaining words. This is a soft clustering.

An example PCFG parse is given in FIG. 3. The non-terminal labeling a terminal (word) may be either a cluster or a type, but the non-terminal labeling a pair of non-terminals is always a type.

The objective function is to maximize the correctness of the Viterbi parses on the training data. The objective function is described in FIG. 4.

As before, the predicates wordAt, term are given as evidence. Now term relates a term to its length. The function maxType takes a set of type/weight pairs and returns the type with the largest weight or $\emptyset$ if the set is empty. The key predicate is char t which holds the chart parse as a set of ground predicates where chart(t, i, j, $\gamma$, x) indicates that for term t the type $\gamma$ spans i to j with log likelihood x. The proposal predicates are isRule, inCluster. The weights of rules and proposals are the log of their probability. The proposals are: change the weight of a parse rule or cluster assignment, add a parse rule, and remove a parse rule. Table 4 gives these proposals formally. The function random(x, y) produces a random number between x and y.

TABLE 4

Proposals for the PCFG Model

| Proposal Formula | Remove | Add |
|---|---|---|
| inCluster(c, w, x) | inCluster(c, w, x) | inCluster(c, w, random(−2, 2)) |
| isRule($\gamma_1$, $\gamma_2$, $\gamma_p$, x) | isRule($\gamma_1$, $\gamma_2$, $\gamma_p$, x) | isRule($\gamma_1$, $\gamma_2$, $\gamma_p$, random(−2, 2)) |
| $\gamma_1 \in C \cup \Gamma \wedge \gamma_2 \in C \cup \Gamma \wedge \gamma_p \in \Gamma$ | $\emptyset$ | isRule($\gamma_1$, $\gamma_2$, $\gamma_p$, random(−2, 2)) |
| isRule($\gamma_1$, $\gamma_2$, $\gamma_p$, x) | isRule($\gamma_1$, $\gamma_2$, $\gamma_p$, x) | $\emptyset$ |

Another key optimization is the use of declarative variable coordination inspired by the imperative variable coordination of Factorie. The formulas with a "⇒" may be read as infinite weight implications, but unlike other approaches to combining hard and soft formulas, states where the hard formulas are violated are not considered. Instead, for every true grounding of the left hand side, a grounding of the right hand side is immediately created. If all the left hand sides supporting a coordinated predicate become false, the corresponding coordinated predicate also becomes false. It may be more clear to consider the predicate on the right hand side as being defined by the disjunction of all its left hand sides.

Because the speed of the training is closely related to the length of the terms, training is only done on terms up to length four. The model is tested, however, on all terms.

Evaluation

The patterns found by the STR algorithm produce a term recognition function, able to decide the type of a term $t=w_1, w_w, \ldots, w_j$ by simply checking for a rule $P(t) \rightarrow \gamma$ in the case of sequence of clusters, or by parsing the term with a chart parser in the PCFG model. In an embodiment of the invention that has been reduced to the practice, the quality of this recognition function was evaluated by testing it on a held out set of terms in the dictionary. As with training, a mapping was considered correct if it maps the term to one of the types given in the dictionary.

For the input dictionary, the Unified Medical Language System (UMLS) was used. UMLS is an ontology of mostly medical terms called atoms. There is a type hierarchy with 133 semantic types these are collected into 15 semantic groups. The semantic groups are a flat and clear division of semantic types. Each UMLS atom may have multiple semantic types and possibly multiple semantic groups. In the test set, 7.2% percent of the atoms had multiple semantic groups.

First the multi-word UMLS atoms were selected that occur in the corpus at least 20 times. The corpus is 3.3 GB of text from Medline abstracts and medical textbooks. This first step is necessary because many UMLS atoms are not terms that occur in text and therefore there is no benefit to recognizing them. This set of UMLS atoms is then divided into a training and test set with 90 percent in the training set and the remaining 10 percent in the test set. STR was trained to recognize the semantic group of the terms in the training set, then the resulting rules were evaluated on the test set. This produced a training size of around 72,000 terms.

For the sequence of clusters model, a precision recall curve was obtained by varying the pattern regularization parameter $\theta_{REG}$. For the PCFG model, the parse score threshold was varied to obtain a precision-recall trade-off.

With a $\theta_{REG}=-20$, a precision of 90.3% and a recall of 25.3% were obtained. Setting the regularization parameter to zero maximizes recall at 48.2% with precision decreasing to 79.9%.

With the parse score threshold of 3.5, a precision of 83.6% was obtained, but with a very low recall, 4.3%. Dropping the threshold entirely gives a precision of 74.1% and a recall of 57.5%. Both of these models substantially outperform the non-joint method described above. A baseline model of selecting the most frequent semantic group would perform at precision=recall=F1 score=23.8%. With a test set of approximately 8,000 all of these differences are highly significant.

Figure 6:
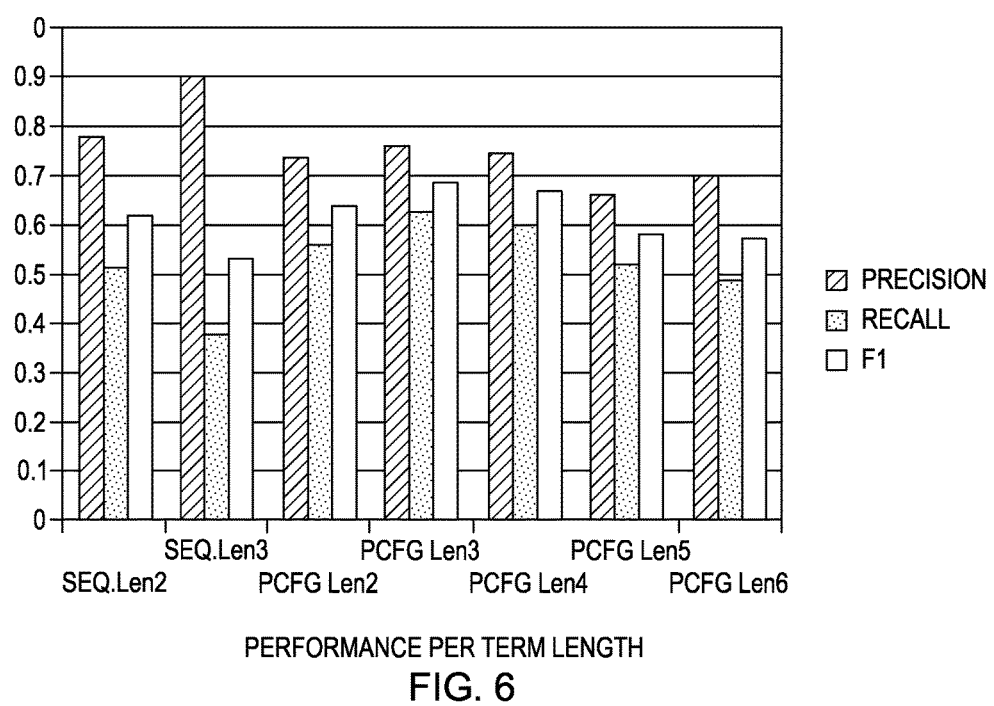
FIG. 6 is a chart showing the performance of different models of embodiments of the invention on different term lengths.

It may be noted that while the sequence of clusters model was evaluated only on length two and three terms, the PCFG model was evaluated on all terms. FIG. 6 compares the performance of each model on different term lengths.

Figure 7:
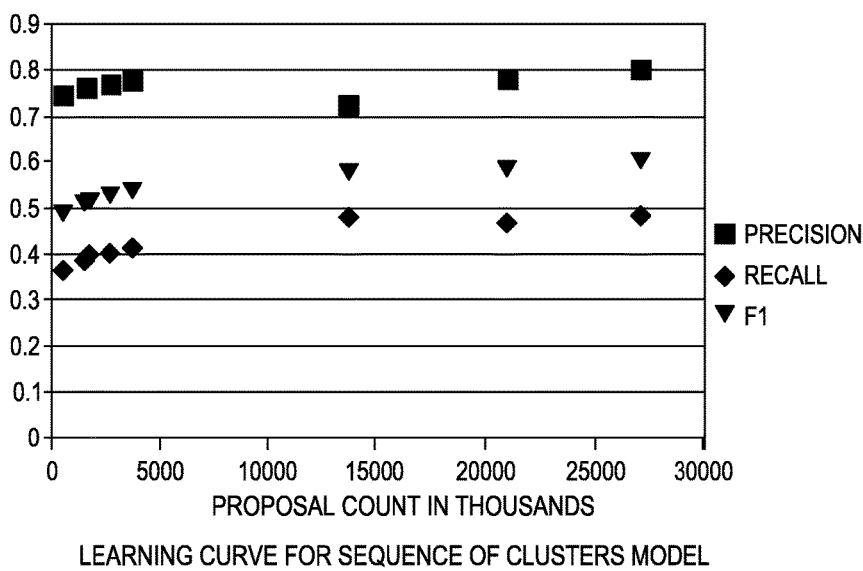
FIG. 7 shows a learning curve for the sequence of clusters model of an embodiment of the invention.

The performance of all models improves as the amount of optimization time increases. The learning curve for the sequence of clusters model is given in FIG. 7. In this, the x-axis is the number of proposals, not the number of training instances. Performance grows from an F1 score of 49.4% with 500 thousand proposals to an F1 score of 60.2% after 27 million proposals.

Figure 8:
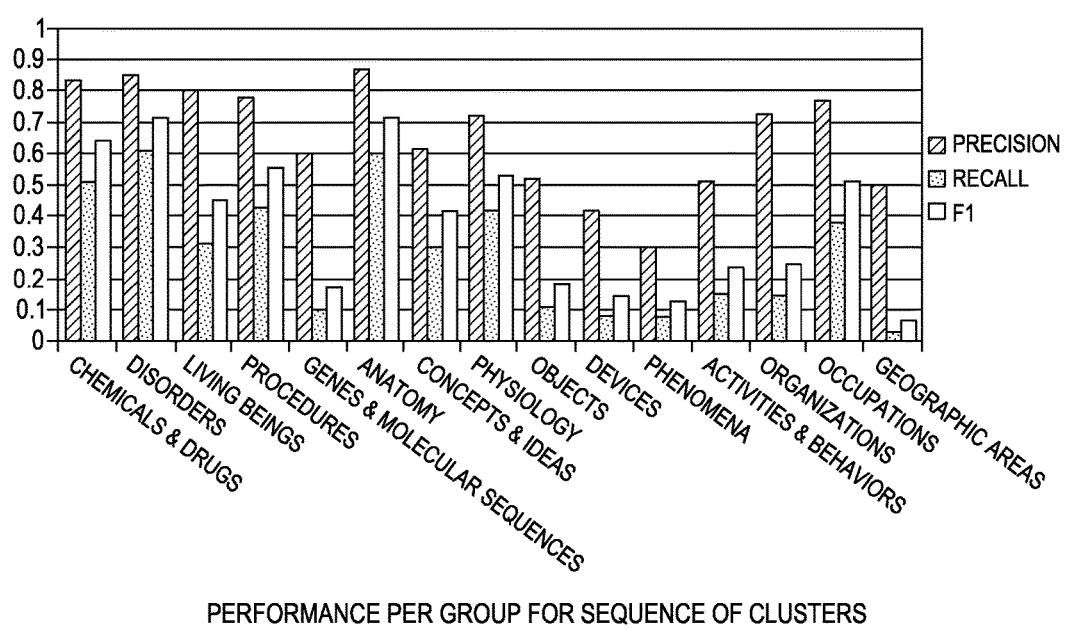
FIG. 8 illustrates the performance per group for the sequence of clusters model of an embodiment of the invention.

The performance per group is given in FIG. 8. The groups are listed in order of their frequency in the dictionary. There is a clear effect of term frequency on performance with all but one of the top performing half of groups in the top half of term frequency.

Figure 9:
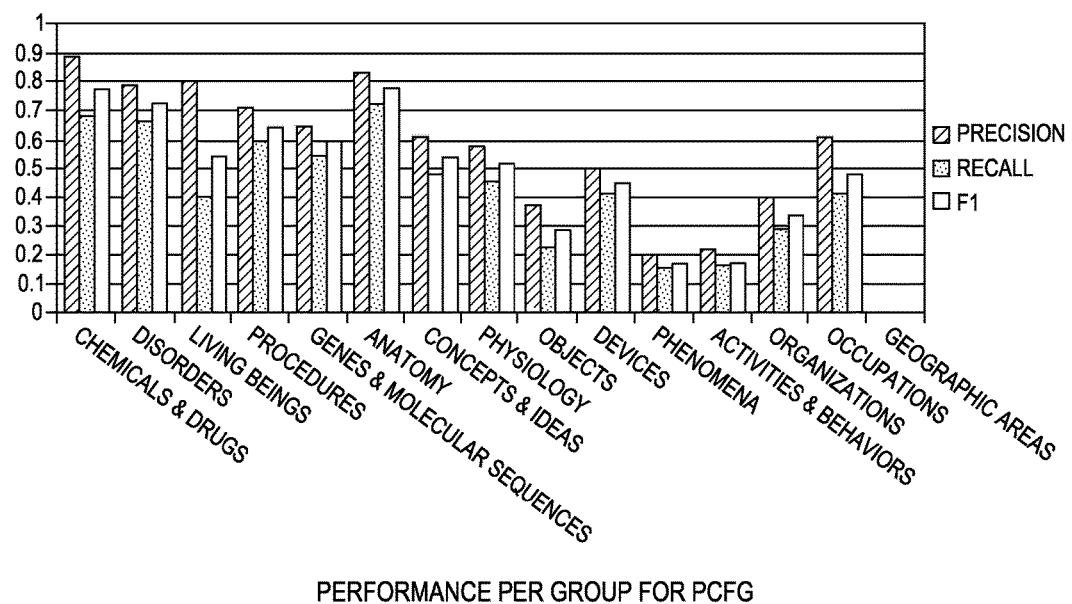
FIG. 9 is a chart, similar to FIG. 8, showing the performance per group for the PCFG model of an embodiment of the invention.
Figure 10:
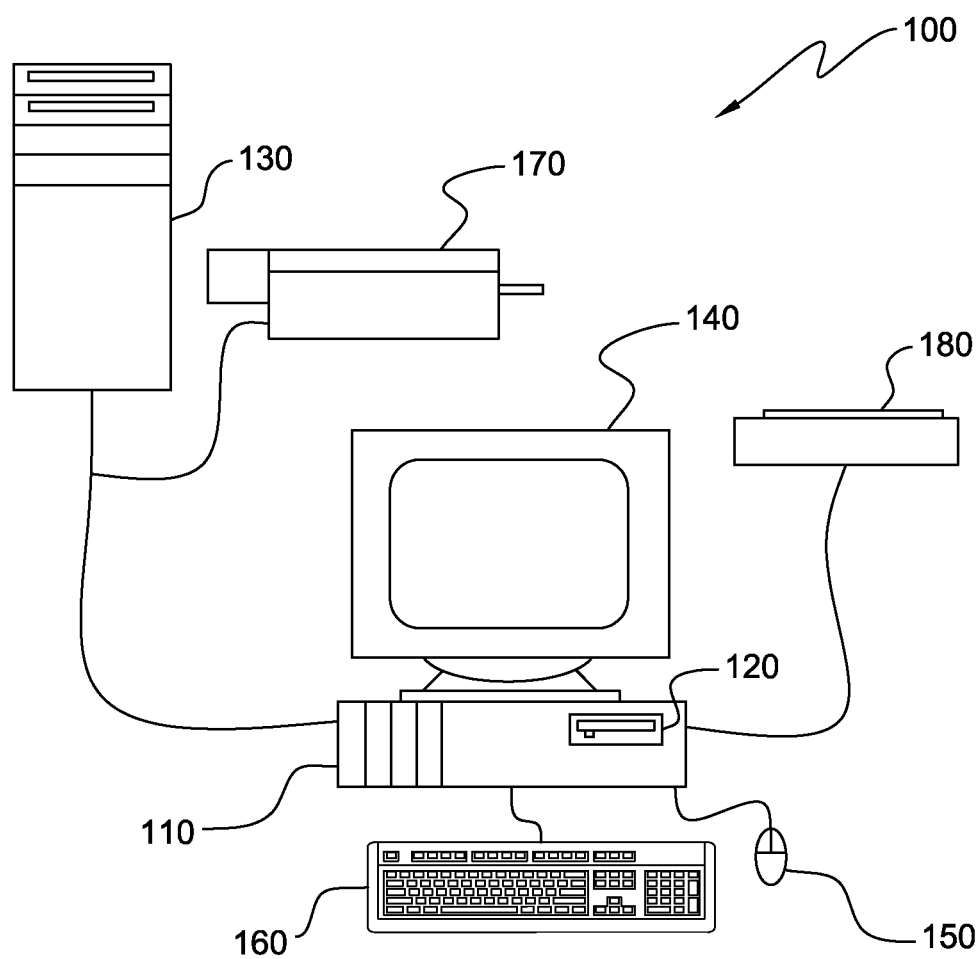
FIG. 10 depicts a computing environment in which embodiments of the invention may be implemented.

The performance of the PCFG model is broken down by group in FIG. 9. The recall and F1 scores on "Genes and Molecular Sequences" and "Devices" show large gains relative to the sequence of clusters model. There is again a clear effect of term frequency. Performance is generally lowest on the semantic groups that are not specifically biomedical: Objects, Devices, Phenomena, Activities & Behaviors, Organizations, Occupations and Geographic Areas. Other than a lower frequency in UMLS, this is likely due to a lower amount of regular structure in these less technical terms.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and application of the invention, and to enable others of ordinary skill in the art to understand the invention for various embodiments with various modifications as are suited to the particular use contemplated.

A computer-based system 100 in which embodiments of the invention may be carried out is depicted in FIG. 11. The computer-based system 100 includes a processing unit 110, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 110 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface. Monitor 140, mouse 250 and keyboard 260 are coupled to the processing unit 110, to provide user interaction. Scanner 180 and printer 170 are provided for document input and output. Printer 170 is shown coupled to the processing unit 110 via a network connection, but may be coupled directly to the processing unit. Scanner 180 is shown coupled to the processing unit 110 directly, but it should be understood that peripherals might be network coupled, or direct coupled without affecting the performance of the processing unit 110.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and application of the invention, and to enable others of ordinary skill in the art to understand the invention for various embodiments with various modifications as are suited to the particular use contemplated.

What is claimed is:

1. computer implemented method of recognizing types of terms in a specified corpus, comprising:
    providing a set of known terms $t \in T$, each of the known terms t belonging to a given set of types $\Gamma$ $(t)=\{\gamma_1, \gamma_2 \ldots\}$, wherein each of the terms is comprised of a list of words, $t=w_1, w_2, \ldots, w_n$, and the union of all the words w for all the terms t is a word set W;
    forming, by a clustering component of a computer system, a multitude of clusters of words from the words in W;
    using, by a mapping determining component of the computer system, the set of known terms T and the given set of types $\Gamma$ to determine a set of pattern-to-type mappings $\{p_1 \to \gamma_1, p_2 \to \gamma_2, \ldots\}$, each of the pattern-to-type mappings $p \to \gamma$ mapping an associated sequence of the clusters of words to one or more of the given set of types $\{\gamma_1, \gamma_2, \ldots\}$;
    using, by a term recognition component of the computer system, the determined set of pattern-to-type mappings to recognize corpus terms in the specified corpus, each of the corpus terms being comprised of two or more words; and
    for each of the recognized corpus terms in the specified corpus, using, by a word mapping component of the computer system, a specified context in the corpus of at least a plurality of the words of said each corpus term to map said plurality of words to one of the sequences of the clusters of words, and using, by a type recognition component of the computer system, one of the determined pattern-to-type mappings to map said one of the sequences of the clusters of words to one or more of the types y of the given set of types $\{\gamma_1, \gamma_2, \ldots\}$ to recognize said one or more of the types $\gamma$ of the given set of types for said each recognized corpus term to boost performance of term recognition systems based on dictionary lookup while extending coverage of ontologies.

2. The method according to claim 1, wherein the using the set of terms T and the set of types $\Gamma$ to determine a set of pattern-to-type mappings includes:
    forming a set of rules R, based on said clusters, to map the terms t to the types $\gamma$.

3. The method according to claim 2, wherein at least one of the words of each of the terms is assigned to at least one of the clusters.

4. The method according to claim 3, wherein the forming a set of rules R includes forming one of the rules $p \to \gamma$ to map one of the terms t to one of the types, based on the clusters to which the words of said one of the terms are assigned.

5. The method according to claim 2, wherein the rules map patterns of the clusters to the types $\gamma$.

6. The method according to claim 2, wherein each word of each term is assigned to one and only one of the clusters.

7. The method according to claim 2, wherein each pattern of the clusters maps to at most one of the types $\gamma$.

8. The method according to claim 2, wherein the words are assigned to the clusters based on distributional similarity of the words.

9. The method according to claim 1, wherein the using the set of pattern-to-type mappings to recognize terms in the specified corpus includes:

selecting a group of words from the specified corpus;
identifying one or more contexts in the specified corpus for each of the selected group of words; and
grouping said selected group of words based on a defined similarity of the co s of the selected words.

10. The method according to claim 1, wherein:
the using a specified context in the corpus of at least a plurality of the words of each of the corpus terms to map said plurality of words to one of the sequences of the clusters of words includes:
for said at least one of the words of the each corpus term, constructing a context vector for said one word, said context vector for said one word including
a set of adjacent words, wherein each of said adjacent words is present in the specified corpus within a given number of words of at least one occurrence of said one word in the specified corpus, and
for each of the adjacent words, a value representing the number of times said each adjacent word is present in the specified corpus within the given number of words of all occurrences of said one word in the specified corpus; and
using the context vector to select the one of the pattern-to-type mappings.

11. The method according to claim 1, wherein:
the word set W is in a medical dictionary;
the recognized corpus terms in the specified corpus are in a medical domain; and
each of the recognized corpus terms includes a word indicating a part of a human anatomy.

12. A computer system for recognizing types of terms in a specified corpus, the computer comprising:
a memory for storing data;
one or more processing units connected to the memory to transmit data to and to receive data from the memory, and configured for:
receiving a set of known terms $t \in T$, each of the known terms t belonging to a given set of types $\Gamma$ (t)=$\{\gamma_1, \gamma_2, \ldots\}$, wherein each of the terms is comprised of a list of words, $t=w_1, w_2, \ldots, w_n$, and the union of all the words w for all the terms t is a word set W;
forming, by a clustering component of the computer system a multitude of clusters of words from the words in W;
using, by a mapping determining component of the computer system, the set of known terms T and the given set of types $\Gamma$ to determine a set of pattern-to-type mappings $\{p_1 \rightarrow \gamma_1, p_2 \rightarrow \gamma_2 \ldots\}$, each of the pattern-to-type mappings $p \rightarrow \gamma$ mapping an associated sequence of the clusters of words to one or more of the given set of types $\{\gamma_1, \gamma_2, \ldots\}$; and
using, by a term recognition component of the computer system, the determined set of pattern-to-type mappings to recognize corpus terms in the specified corpus, each of the corpus terms being comprised of two or more words; and
for each of the recognized corpus terms in the specified corpus, using, by a word mapping component of the computer system, a specified context in the corpus of at least a plurality of the words of said each corpus term to map said plurality of words to one of the sequences of the clusters of words, and using, by a type recognition component of the computer system, one of the determined pattern-to-type mappings to map said one of the sequences of the clusters of words to one or more types $\gamma$ of the given set of types $\{\gamma_1, \gamma_2, \ldots\}$ to recognize said one or more of the types $\gamma$ of the given set of types for said each recognized corpus term to boost performance of term recognition systems based on dictionary lookup while extending coverage of ontologies.

13. The system according to claim 12, wherein the using the set of terms T and the set of types to determine a set of pattern-to-type mappings includes:
forming a set of rules R, based on said clusters, to map the terms t to the types $\gamma$.

14. The system according to claim 13, wherein:
at least one of the words of each of the terms is assigned to at least one of the clusters; and
the forming a set of rules R includes forming one of the rules p to map one of the terms t to one of the types $\gamma$, based on the clusters to which the words of said one of the terms are assigned.

15. The system according to claim 12, wherein the using the set of pattern-to-type mappings to recognize terms in the specified corpus includes:
selecting a group of words from the specified corpus;
identifying one or more contexts in the specified corpus for each of the selected group of words; and
grouping said selected group of words based on a defined similarity of the contexts of the selected words.

16. An article of manufacture comprising:
at least one computer readable hardware medium tangibly embodying a program of instructions for recognizing types of terms in a specified corpus, said program of instructions, when executing in a computer, performing the following:
receiving at the computer a set of known terms $t \in T$, each of the known terms t belonging to a given set of types $\Gamma$ (t)=$\{\gamma_1, \gamma_2, \ldots\}$, wherein each of the terms is comprised of a list of words, $t=w_1, w_2, \ldots, w_n$, and the union of all the words w for all the terms t is a word set W;
forming at a clustering component of the computer a multitude of clusters of words from the words in W;
using at a mapping determining component of the computer the set of known terms T and the given set of types $\Gamma$ to determine a set of pattern-to-type mappings $\{p_1 \rightarrow \gamma_1, p_2 \rightarrow \gamma_2, \ldots\}$, each of the pattern-to-type mappings $p \rightarrow \gamma$ mapping as associated sequence of the clusters of words to one or more of the given set of types $\{\gamma_1, \gamma_2, \ldots\}$; and
using at a term recognition component of the computer the determined set of known pattern-to-type mappings to recognize corpus terms in the specified corpus, each of the corpus terms being comprised of two or more words; and
for each of the recognized corpus terms in the specified corpus, using at a word mapping component of the computer a specified context in the corpus of at least a plurality of the words of said each corpus term to map said plurality of words to one of the sequences of the clusters of words, and using, at a type recognition component of the computer system, one of the determined pattern-to-type mappings to map said one of the sequences of the clusters of words to one or more types $\gamma$ of the given set of types $\{\gamma_1, \gamma_2, \ldots\}$ to recognize said one or more of the types $\gamma$ of the given set of types for said each recognized corpus term to boost performance of term recognition systems based on dictionary lookup while extending coverage of ontologies.

17. The article of manufacture according to claim 16, wherein the using the set of terms T and the set of types to determine a set of pattern-to-type mappings includes:

forming a set of rules R, based on said clusters, to map the terms t to the types γ.

18. The article of manufacture according to claim 17, wherein:
- at least one of the words of each of the terms is assigned to at least one of the clusters; and
- the forming a set of rules R includes forming one of the rules p to map one of the terms t to one of the types , based on the clusters to which the words of said one of the terms are assigned.

19. The article of manufacture according to claim 16, wherein the using the set of pattern-to-type mappings to recognize terms in the specified corpus includes:
- selecting a group of words from the specified corpus;
- identifying one or more contexts in the specified corpus for each of the selected group of words; and
- grouping said selected group of words based on a defined similarity of the contexts of the selected words.

* * * * *